US012811722B2

(12) United States Patent
Rahman

(10) Patent No.: US 12,811,722 B2
(45) Date of Patent: Nov. 24, 2026

(54) CYCLIC REDUNDANCY CHECK (CRC) REDUCTION FOR MULTIPLE-INPUT AND MULTIPLE-OUTPUT (MIMO) COMMUNICATIONS

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 721 days.

(21) Appl. No.: 18/321,663

(22) Filed: May 22, 2023

(65) Prior Publication Data

US 2024/0396667 A1 Nov. 28, 2024

(51) Int. Cl.

| | |
|---|---|
| ***H04L 1/00*** | (2006.01) |
| ***H04B 7/0413*** | (2017.01) |
| ***H04W 28/04*** | (2009.01) |

(52) U.S. Cl.

CPC ......... *H04L 1/0061* (2013.01); *H04B 7/0413* (2013.01); *H04W 28/04* (2013.01)

(58) Field of Classification Search

CPC ..... H04L 1/0061; H04B 7/0413; H04W 28/04

See application file for complete search history.

(56) References Cited

U.S. PATENT DOCUMENTS

| | | | |
|---|---|---|---|
| 7,249,306 | B2 | 7/2007 | Chen |
| 7,363,573 | B1 | 4/2008 | Bataineh |
| 7,392,460 | B2 | 6/2008 | Kim et al. |
| 7,853,857 | B2 | 12/2010 | Buckley et al. |
| 7,916,775 | B2 | 3/2011 | Kim et al. |
| 8,234,551 | B2 | 7/2012 | Shen et al. |
| 8,255,761 | B1 | 8/2012 | Pi et al. |
| 8,259,643 | B2 | 9/2012 | Nam et al. |
| 8,266,513 | B2 | 9/2012 | Kim et al. |
| 8,270,359 | B2 | 9/2012 | Nangia et al. |
| 8,331,386 | B2 | 12/2012 | Carmon et al. |
| 8,375,271 | B2 | 2/2013 | Cheng et al. |
| 8,537,750 | B2 | 9/2013 | Blankenship et al. |
| 8,555,148 | B2 | 10/2013 | Pi et al. |

(Continued)

FOREIGN PATENT DOCUMENTS

| | | | |
|---|---|---|---|
| CN | 102571266 | B | 11/2015 |
| CN | 106888072 | B | 2/2020 |

(Continued)

*Primary Examiner* — Justin T Van Roie

(74) *Attorney, Agent, or Firm* — Ashurst Perkins Coie US LLP

(57) ABSTRACT

Techniques related to reduction of cyclic redundancy check (CRC) overhead in multiple-input-multiple-output (MIMO) transmissions are disclosed. In one example aspect, a method for wireless communication includes determining a transport block for a transmission of data bits, determining multiple layers corresponding to multiple antennas for performing the transmission, and determining a mapping between the transport block and the multiple layers for the transmission. The method also includes selectively omitting a CRC attachment in one or more portions of the transport block in response to a CRC being attached in one portion of the transport block and mapping the transport block to a physical channel for transmission.

20 Claims, 7 Drawing Sheets

(56) References Cited

U.S. PATENT DOCUMENTS

| | | | | |
|---|---|---|---|---|
| 8,634,366 | B2 | 1/2014 | Kim et al. | |
| 8,745,469 | B2 | 6/2014 | Seo et al. | |
| 8,862,958 | B2 * | 10/2014 | Pi | H03M 13/09 714/752 |
| 9,160,485 | B2 | 10/2015 | Kim et al. | |
| 9,204,437 | B2 | 12/2015 | Smee et al. | |
| 10,057,892 | B2 | 8/2018 | Beluri et al. | |
| 10,063,346 | B2 | 8/2018 | Heinle et al. | |
| 10,148,290 | B2 | 12/2018 | Noh et al. | |
| 10,291,356 | B2 | 5/2019 | Nammi et al. | |
| 10,389,481 | B2 | 8/2019 | Ren et al. | |
| 10,432,760 | B1 | 10/2019 | Zhang et al. | |
| 10,560,228 | B2 | 2/2020 | Andreoli-Fang et al. | |
| 10,615,915 | B2 | 4/2020 | Andersson et al. | |
| 10,631,285 | B2 | 4/2020 | Lee | |
| 10,680,751 | B2 | 6/2020 | Sarkis et al. | |
| 11,063,699 | B2 | 7/2021 | Noh et al. | |
| 11,259,334 | B2 | 2/2022 | Akkarakaran et al. | |
| 11,317,413 | B2 | 4/2022 | Sundararajan et al. | |
| 11,411,693 | B2 | 8/2022 | Chou | |
| 11,445,481 | B2 | 9/2022 | Kodali et al. | |
| 11,451,333 | B2 | 9/2022 | Andersson et al. | |
| 11,457,379 | B2 | 9/2022 | Chen et al. | |
| 11,581,982 | B2 | 2/2023 | Hosseini et al. | |
| 11,616,597 | B1 | 3/2023 | Kutz et al. | |
| 2003/0123409 | A1 | 7/2003 | Kwak et al. | |
| 2008/0225965 | A1 | 9/2008 | Pi et al. | |
| 2009/0313516 | A1 | 12/2009 | Shin et al. | |
| 2010/0239035 | A1 | 9/2010 | Blankenship et al. | |
| 2011/0305289 | A1 | 12/2011 | Lee et al. | |
| 2017/0250844 | A1 | 8/2017 | Wu et al. | |
| 2018/0145703 | A1 * | 5/2018 | Li | H04L 1/0045 |
| 2018/0323909 | A1 | 11/2018 | Mng et al. | |
| 2019/0140774 | A1 | 5/2019 | Noh et al. | |
| 2020/0351027 | A1 * | 11/2020 | Hosseini | H04L 1/1812 |
| 2020/0366409 | A1 * | 11/2020 | Xu | H04L 1/0041 |
| 2022/0286225 | A1 | 9/2022 | Liang et al. | |
| 2022/0376820 | A1 | 11/2022 | Sandberg et al. | |
| 2023/0024430 | A1 | 1/2023 | Lee et al. | |
| 2023/0037889 | A1 | 2/2023 | Yao et al. | |
| 2023/0046738 | A1 | 2/2023 | Lee et al. | |
| 2023/0058672 | A1 | 2/2023 | Guo et al. | |
| 2023/0139174 | A1 * | 5/2023 | Paz | H04B 7/12 370/329 |
| 2024/0089029 | A1 * | 3/2024 | Abotabl | H03M 13/09 |
| 2024/0204915 | A1 * | 6/2024 | Cheng | H04L 1/0061 |

FOREIGN PATENT DOCUMENTS

| | | | |
|---|---|---|---|
| CN | 111654884 | A | 9/2020 |
| CN | 112448790 | A | 3/2021 |
| EP | 2043269 | A2 | 4/2009 |
| EP | 2052483 | A2 | 4/2009 |
| EP | 1556982 | B1 | 11/2009 |
| EP | 2204926 | A2 | 7/2010 |
| EP | 2893664 | A1 | 7/2015 |
| EP | 2862306 | B1 | 7/2016 |
| EP | 3157184 | A1 | 4/2017 |
| EP | 3292669 | A1 | 3/2018 |
| EP | 2827666 | B1 | 3/2019 |
| EP | 3664326 | A1 | 6/2020 |
| EP | 3734890 | A1 | 11/2020 |
| EP | 3832922 | A1 | 6/2021 |
| EP | 3329620 | B1 | 3/2022 |
| EP | 3254394 | B1 | 11/2022 |
| JP | 6088574 | B2 | 2/2017 |
| JP | 7195255 | B2 | 12/2022 |
| KR | 20040061552 | A | 7/2004 |
| KR | 100592696 | B1 | 6/2006 |
| KR | 20060061199 | A | 6/2006 |
| KR | 100690274 | B1 | 3/2007 |
| KR | 20090077710 | A | 7/2009 |
| KR | 101168159 | B1 | 7/2012 |
| KR | 101205499 | B1 | 11/2012 |
| KR | 101443540 | B1 | 9/2014 |
| KR | 101551830 | B1 | 9/2015 |
| KR | 101551831 | B1 | 9/2015 |
| KR | 101785609 | B1 | 10/2017 |
| KR | 102117669 | B1 | 6/2020 |
| KR | 20210006884 | A | 1/2021 |
| KR | 20210019103 | A | 2/2021 |
| KR | 102328864 | B1 | 11/2021 |
| KR | 102338852 | B1 | 12/2021 |
| WO | 2009076371 | A1 | 6/2009 |
| WO | 2011160449 | A1 | 12/2011 |
| WO | 2012034099 | A1 | 3/2012 |
| WO | 2014089148 | A1 | 6/2014 |
| WO | 2016108556 | A1 | 7/2016 |
| WO | 2017116789 | A1 | 7/2017 |
| WO | 2018028476 | A1 | 2/2018 |
| WO | 2018030736 | A1 | 2/2018 |
| WO | 2018032014 | A1 | 2/2018 |
| WO | 2018127286 | A1 | 7/2018 |
| WO | 2018171441 | A1 | 9/2018 |
| WO | 2018171627 | A1 | 9/2018 |
| WO | 2018172992 | A1 | 9/2018 |
| WO | 2018204514 | A1 | 11/2018 |
| WO | 2020144346 | A1 | 7/2020 |
| WO | 2020204540 | A1 | 10/2020 |
| WO | 2020226372 | A1 | 11/2020 |

* cited by examiner

CYCLIC REDUNDANCY CHECK (CRC) REDUCTION FOR MULTIPLE-INPUT AND MULTIPLE-OUTPUT (MIMO) COMMUNICATIONS

BACKGROUND

A cyclic redundancy check (CRC) is an error-detecting technique commonly used in wireless communication networks to detect transmission errors in a frame or block of digital data. CRCs are designed to provide reasonable assurance of data integrity to protect against common types of errors on communication channels.

BRIEF DESCRIPTION OF THE DRAWINGS

Detailed descriptions of implementations of the present invention will be described and explained through the use of the accompanying drawings.

Figure 1:
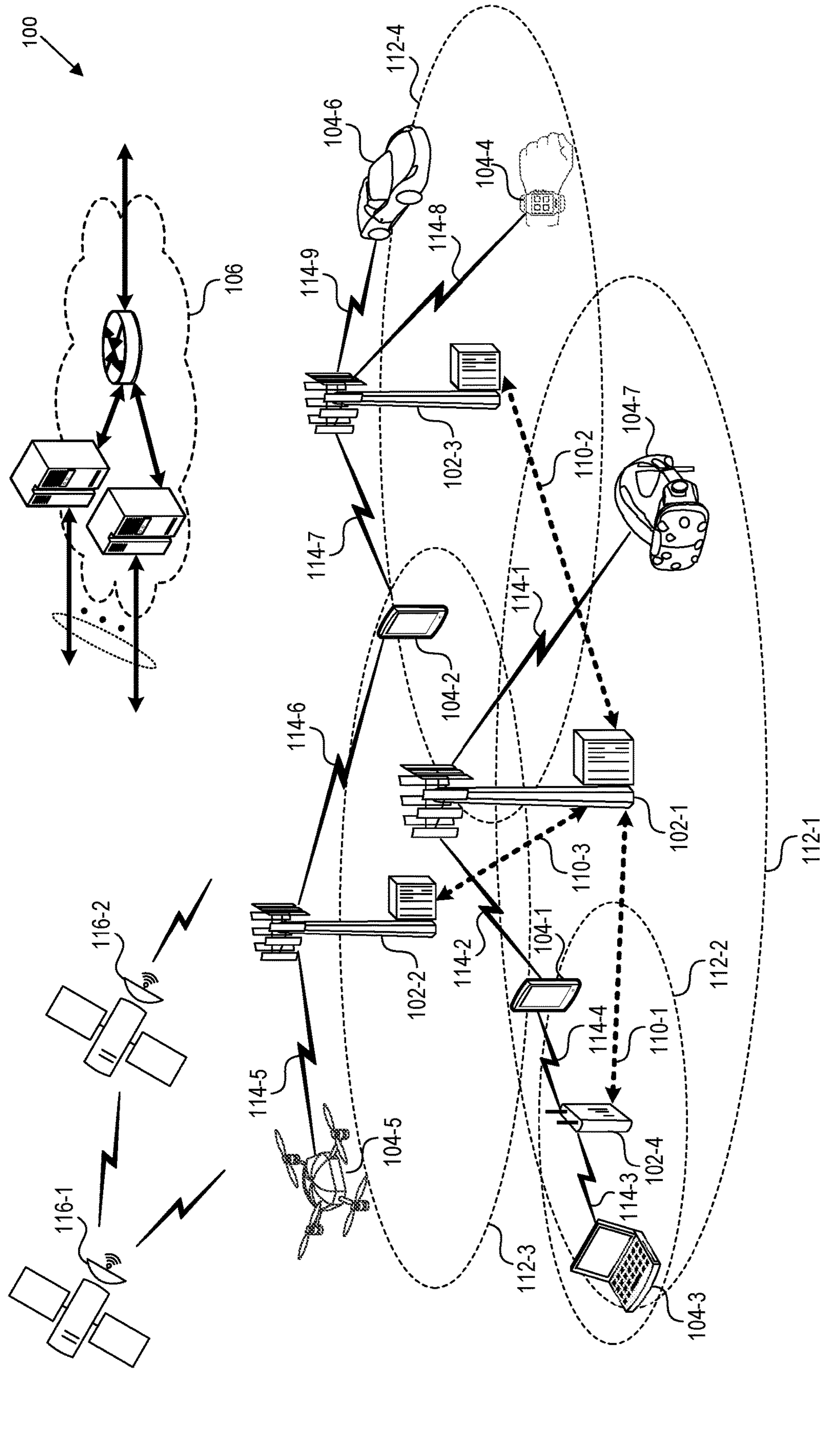
FIG. 1 is a block diagram that illustrates components of a computing device.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In wireless communications, data transmissions between wireless communication devices are prone to loss and fading as the data is transmitted from one device to another. Traditionally, wireless communication devices attach CRCs to transport blocks containing data to identify transmission errors. CRCs play an important role in data transmissions by detecting changes to the original data during the data transmission process by adding a checksum to the data and comparing the checksum to a calculated checksum at a receiving device. However, attaching CRCs to transport blocks increases overhead and reduces resource utilization because each CRC occupies bits that can otherwise be utilized to carry actual data.

The disclosed technologies address these and other problems of conventional systems by taking advantage of multiple receivers aligned in geospatial proximity to reduce the number of CRCs attached to transmitted data. Data beams that are geospatially proximate to each other are typically exposed to similar transmission errors, such as loss and fading due to signal dampening factors, such as jitter, noise, signal distortion, and so on. As such, a data beam with CRC attached can be used as a proxy to determine error conditions of other data beams that are in geospatial proximity to the data beam. After the receiver receives a first data beam and performs an error check, the receiver can use the same CRC output to decode other data beams that are geospatially proximate to the first data beam. As one data beam acts as an error-detecting beam for other data beams in geospatial proximity, the need for CRC attachment for the other data beams in geospatial proximity is reduced. As a result, more resources can be allocated to carry actual payload/data, and the receiver can receive a greater amount of data due to the absence of CRCs in the other geospatially proximate data beams.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a UE, a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the era of 6G and beyond, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

Cyclic Redundancy Check (CRC) Reduction Using Multiple-Input and Multiple-Output (MIMO) Communications Detecting errors, such as bit errors, burst errors, packet loss, and/or fading, caused by transmission channels is important in both uplink and downlink communications to ensure integrity of the transmitted data between a base station and a UE. A CRC is a well-known error-detection technique that is used in wireless communication networks for error detection. For example, in the downlink direction when data needs to be transmitted from the base station to the UE, the MAC layer of the base station organizes the data into transport blocks and transmits the data via a physical channel, such as the Physical Downlink Shared Channel (PDSCH).

Figure 2A:
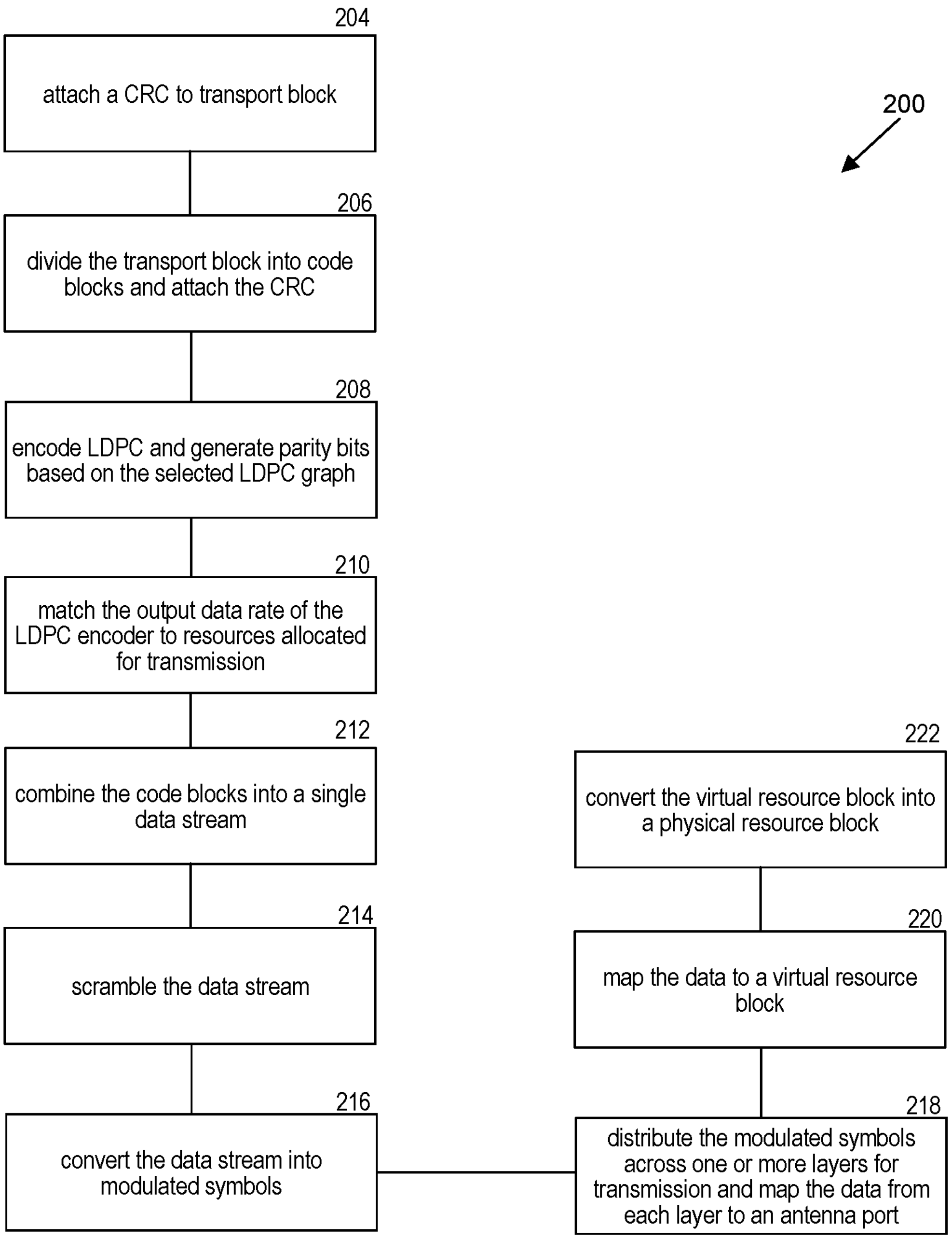
FIG. 2A is a flowchart representation of an example process for transmitting data to a user equipment (UE) from a base station.

FIG. 2A is a flowchart representation of an example process for transmitting data to the UE from the base station. The process 200 comprises, at Operation 204, attaching a CRC to a transport block. The CRC is a fixed-size checksum generated by applying a polynomial function to the transport block data. At Operation 206, if the size of the transport block is too large for efficient low-density parity check (LDPC) coding, the transport block is divided into multiple equal-sized segments called code blocks. After segmentation, the CRC is calculated and attached to each code block individually. At Operation 208, LDPC encoding is performed using an LDPC graph selected based on the size of the transport block being transmitted over the PDSCH. The LDPC encoding enables efficient channel coding, ensuring reliable data transmission and optimized performance based on the transport block size. The LDPC encoding process takes the multiple code blocks with attached CRCs as input and generates parity bits based on the LDPC graph. The parity bits are appended to the original data bits, forming encoded bits.

At Operation 210, the output data rate of the LDPC encoder is matched to the available resources allocated for transmission over the PDSCH. At Operation 212, the multiple processed code blocks are combined into a single data stream for transmission. At Operation 214, the data stream is scrambled using a cell-specific scrambling sequence to ensure the transmitted signal has a desirable power distribution across different frequency and time resources. At Operation 216, the binary data stream is converted into modulated symbols based on a modulation scheme suitable for transmission. Choice of modulation scheme depends on factors including channel conditions, link adaptation, and UE capabilities.

At Operation 218, the modulated symbols are distributed across one or more layers for transmission using multiple antennas. The data from each layer are then mapped to each antenna port. At Operation 220, for each antenna step, a virtual resource grid called a virtual resource block (VRB) is created. Within the resource grid, each of the resource elements is filled with PDSCH data from the lowest frequency to the highest frequency. At Operation 222, the VRB is converted into a physical resource block.

Figure 2B:
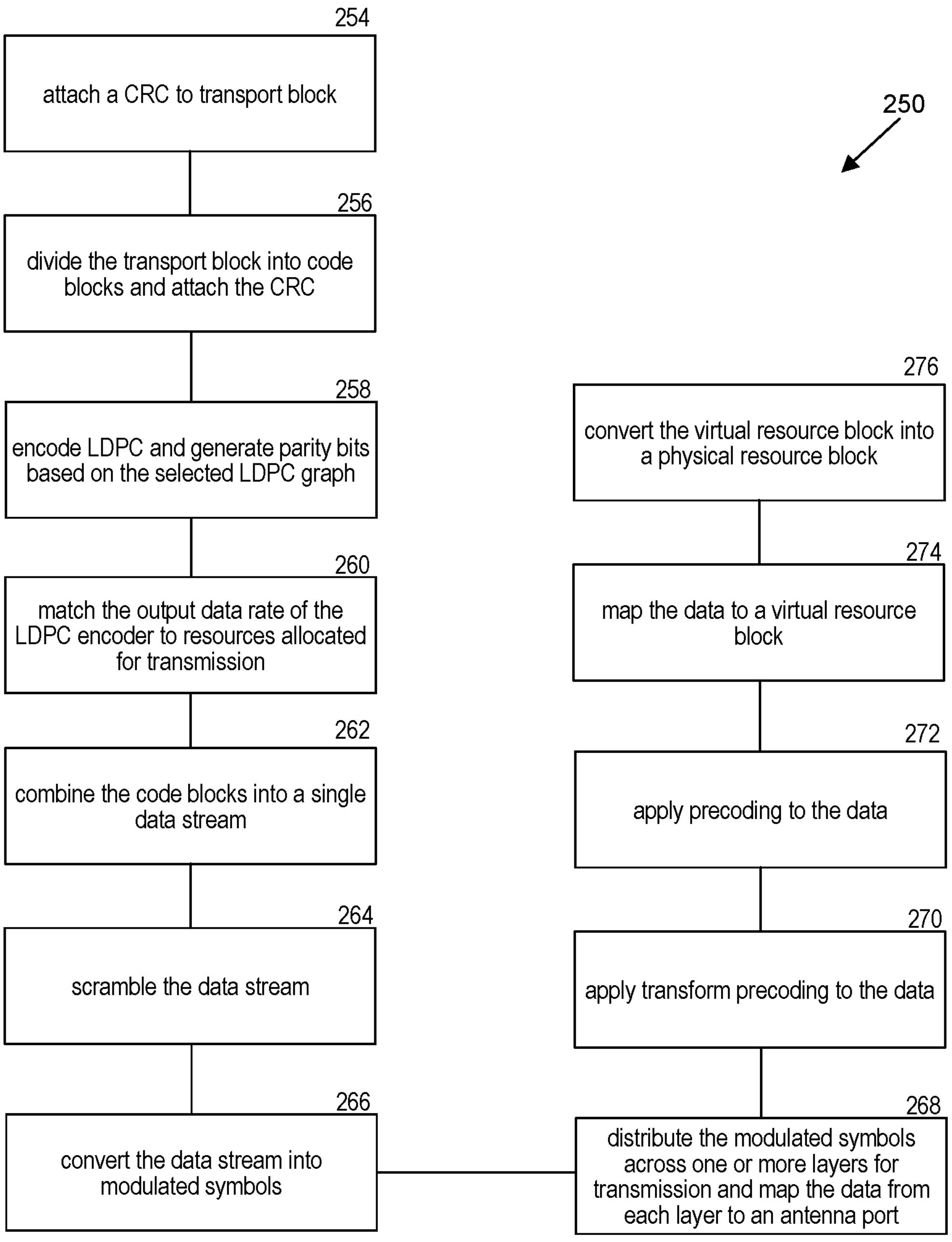
FIG. 2B is a flowchart representation of an example process transmitting data to the base station from the UE.

In the uplink direction, when data needs to be transmitted from the UE to the base station, the MAC layer of the UE organizes the data into transport blocks and transmits the data via the physical channel, such as the Physical Uplink Shared Channel (PUSCH). FIG. 2B is a flowchart representation of an example process for transmitting data to the base station from the UE. The process 250 is similar to the process 200. Operations 254-268 are identical to Operations 204-218 as discussed in connection with FIG. 2A except that these operations are performed by the UE. At Operation 270, the process 250 comprises applying transform precoding to the data to reduce peak-to-average power ratio of a waveform. At Operation 272, the resulting data from Operation 270 is multiplied by a precoding matrix. Operations 274 and 276 involve mapping the data to a VRB and then converting the VRB into a physical resource block, similar to Operations 220 and 222 from FIG. 2A.

As shown in FIGS. 2A-2B, the CRC is attached to the transport block or to multiple code blocks of the transport block if segmentation is performed. Given the limited resources in wireless communications, however, attaching CRCs to transport blocks and/or to multiple code blocks increases overhead and reduces resource utilization because each CRC occupies bits that can otherwise be utilized to carry actual data. This patent document discloses techniques that can be implemented in various embodiments to improve resource utilization by reducing the number of CRCs attached to code blocks for data transmission. In particular, the disclosed technology takes advantage of beam characteristics in MIMO communications. The MIMO technique can improve capacity and performance of a wireless communication network by transmitting multiple data beams toward the receiving device at the same time using the same frequency and resources.

Figure 3:
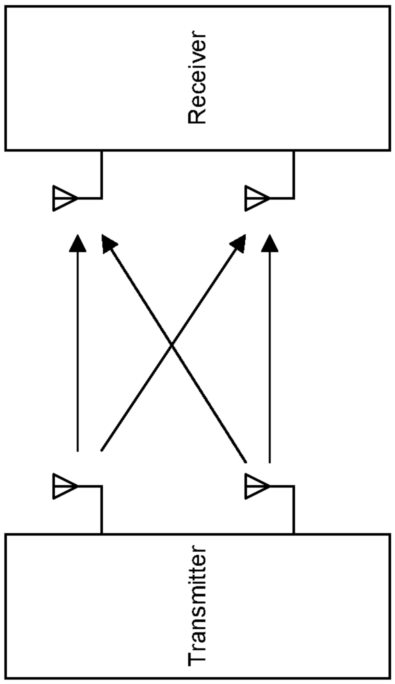
FIG. 3 is a schematic diagram that illustrates an example MIMO configuration in accordance with one or more embodiments of the present technology.

FIG. 3 is a schematic diagram that illustrates an example MIMO configuration in accordance with one or more embodiments of the present technology. As shown in FIG. 3, MIMO is characterized by having multiple antennas in the transmitter and the receiver. The example illustrated in FIG. 3 is called a 2×2 MIMO because the transmitter has two antennas and the receiver has two antennas.

There are two types of MIMO systems: single-user MIMO (SU-MIMO) systems and multi-user MIMO (MU-MIMO) systems. In the SU-MIMO systems, the transmitter communicates with only one receiver at a time. Multi-user MIMO (MU-MIMO) systems enable the transmitter to communicate with multiple receivers simultaneously by leveraging beamforming technology. Beamforming technology involves transmitting data on multiple antennas with deliberate timing offsets to have different data stream signals constructively interfere at a particular point in space, e.g., locations of the receivers. In some embodiments, multiple receivers are aligned in a specific geospatial way such that a data beam formed through constructive interference of data stream signals from the transmitter reaches multiple receivers. The receivers thus benefit from the resulting increase in network throughput due to utilization of multiple antennas.

Data beams that are geospatially close to each other are typically exposed to similar conditions, such as signal dampening conditions and/or errors. As such, a first data beam with a CRC attached can be used as a proxy to determine error conditions of other data beams that are in geospatial proximity to the first data beam. After the receiver receives a first data beam and performs an error check, the receiver can use the same CRC output to decode other data beams that are geospatially proximate to the first data beam. As one data beam acts as an error-detecting beam for other geospatially proximate data beams, the need for CRC transmission for other data beams in geospatial proximity is reduced. As a result, more resources can be allocated to carry actual payload/data, and the receiver can receive a greater amount of data due to the absence of CRCs in the other geospatially proximate data beams.

Figure 4:
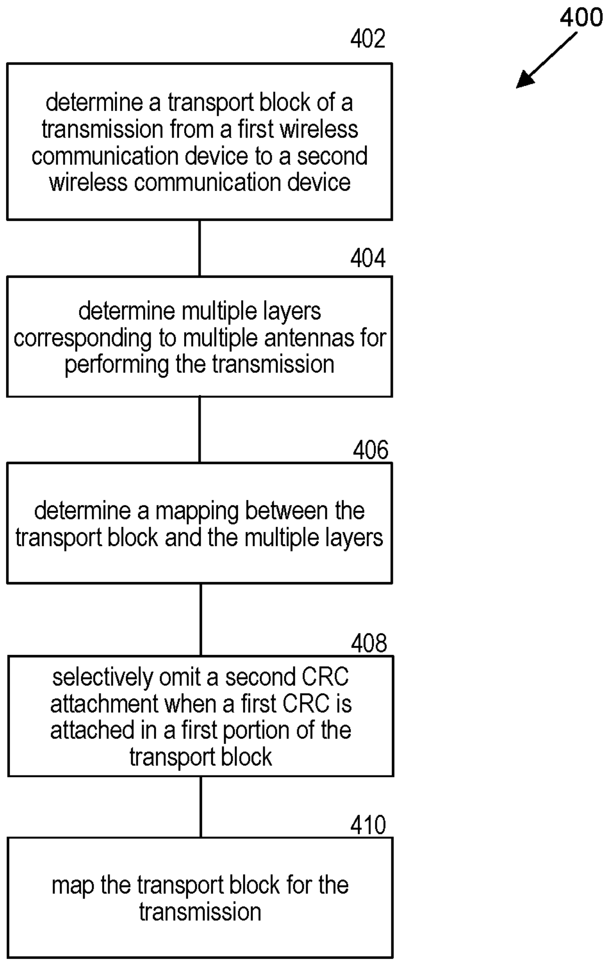
FIG. 4 is a flowchart representation of an example process or method for wireless communication in accordance with one or more embodiments of the present technology.

FIG. 4 is a flowchart representation of an example process or method for wireless communication in accordance with one or more embodiments of the present technology. The process 400 comprises, at Operation 402, determining, by a first wireless communication device, a transport block for transmission of data bits from the first wireless communication device to a second wireless communication device. The first wireless communication device can be a base station, and the second wireless communication device can be a UE. Alternatively, the first wireless communication device can be the UE, and the second wireless communication device can be the base station.

At Operation 404, the first wireless communication device determines layers corresponding to multiple antennas for performing the transmission of the data bits. The number of layers for performing the transmission of the data bits depends on various factors including the availability of physical antennas, capability of the second wireless communication device on the receiving end of the data transmission process, and/or transmission channel conditions.

At Operation 406, the first wireless communication device determines mapping between the transport block and the multiple layers for transmission to the second wireless communication device. Depending on the number of antennas associated with the first wireless communication device, the first wireless communication device can distribute the data bits for transmission to the available antennas to fully utilize the capacity of the first wireless communication device and increase data throughput.

As discussed in connection with FIGS. 2A-2B, in some embodiments, if the size of the transport block exceeds a predetermined threshold for LDPC encoding, the transport block is divided into multiple code blocks. In some embodiments, the first wireless communication device determines the mapping between the transport block and the multiple layers prior to rate matching and/or modulating the transport block into modulated symbols so that the first wireless communication device can make decisions regarding how many CRC attachments are needed for the code blocks. In some embodiments, a CRC is attached to only a subset of code blocks, based on geospatial proximity, so as to reduce the CRC cost and increase the bits available for carrying actual data.

Different portions of the transport block can be mapped to different layers for performing the transmission of the data bits. For example, when segmentation occurs, the transport block is divided into multiple code blocks including at least a first portion and a second portion of the transport block. The code block representing the first portion of the transport block is mapped to a first layer, and the code block representing the second portion of the transport block is mapped to a second layer. After the first wireless communication device determines the mapping, a CRC is attached to the code block for the first portion of the transport block.

At Operation 408, the first wireless communication device selectively omits a CRC attachment to the second portion of the transport block based on the layers. For example, two layers corresponding to different beams are mapped to the first portion and the second portion of the transport block, respectively. The first wireless communication device determines that the CRC attached to the first portion of the transport block can be used as a proxy to estimate error propensity in the second portion of the transport block due to the geospatial proximity of beams. Correspondingly, the CRC bits for the second code block are omitted—these bits can be used to transmit additional data instead. At Operation 410, the first wireless communication device maps the transport block to a physical channel for transmission to the second wireless communication device.

In some embodiments, the first wireless communication device determines that other beams corresponding to layers mapped to additional code blocks of the transport block are also geospatially close to the beam corresponding to the first layer and thus exhibit similar transmission characteristics. The first communication devices can subsequently omit CRC attachments in remaining parts of the transport block mapped to the remaining layers.

In some embodiments, the first wireless communication device omits a CRC attachment in a subset of layers that have adjacent rank values. Depending on the beamforming techniques, adjacent rank values correspond to beams that have similar geospatial characteristics. For example, a transport block can be divided into three code blocks, with each code block mapped to one of the three layers corresponding to antennas for transmission of data bits. The first wireless communication device attaches CRC bits to the first portion of the transport block. Upon determining that adjacent layers are geospatially close to the beam corresponding to the first layer, the first wireless communication device omits the CRC attachments to the second and third portions of the transport block which are mapped to second and third layers, respectively. The CRC attachment to the first portion of the transport block can be used to estimate error propensity in the second portion and the third portion of the transport block.

In some embodiments, the first wireless communication device omits a CRC attachment in a subset of layers that have even or odd rank values. Depending on the beamforming techniques, interleaving rank values (e.g., even ranks or odd ranks) correspond to beams that have similar geospatial characteristics. For example, a transport block can be divided into five code blocks, with each code block mapped to one of the five layers corresponding to antennas for transmission of data bits. The first wireless communication device attaches CRC bits to the first portion of the transport block. Upon determining that odd-ranked layers are geospatially close, the first wireless communication device omits a CRC attachment in a subset of layers that have odd rank values. The CRC attachment to the first portion of the transport block can be used to estimate error propensity in the third portion and the fifth portion of the transport block. Similarly, upon determining that even-ranked layers are geospatially close, the first wireless communication device can omit a CRC attachment in a subset of layers that have even rank values. The CRC attachment to the second portion of the transport block can be used to estimate error propensity in the fourth portion of the transport block.

Figure 5:
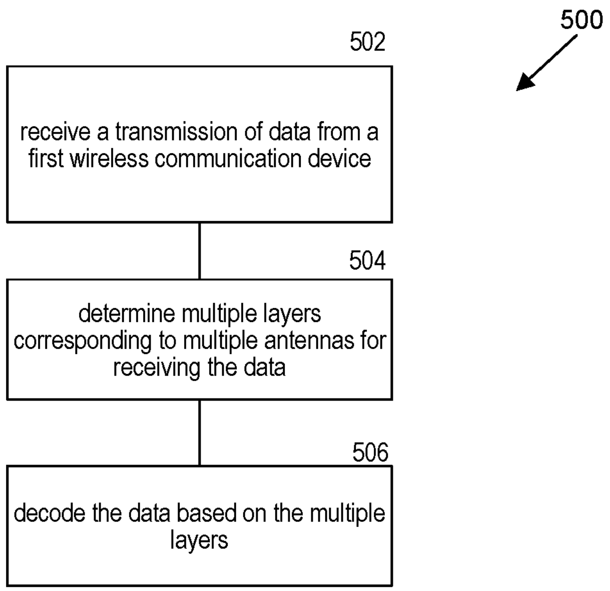
FIG. 5 is a flowchart representation of an example process or method for wireless communication in accordance with one or more embodiments of the present technology.

FIG. 5 is a flowchart representation of an example process or method for wireless communication in accordance with one or more embodiments of the present technology. The process 500 comprises, at Operation 502, receiving, by a second wireless communication device, a transmission of data from a first wireless communication device. In some embodiments, the second wireless communication device can be a UE receiving a transmission of data from a base station on a PDSCH. In other embodiments, the second wireless communication device can be the base station receiving a transmission of data from the UE on a PUSCH.

At Operation 504, the second wireless communication device determines multiple layers corresponding to multiple antennas for receiving the data. The number of layers for receiving the transmission of the data bits depends on various factors including the availability of physical antennas, capability of the first wireless communication device on the transmitting end of the data transmission process, and transmission channel conditions.

At Operation 506, the second wireless communication device decodes the transmitted data based on the multiple layers. The second wireless communication device performs data decoding to correct errors that may have occurred during data transmission. The data can be decoded as a transport block that comprises multiple portions each mapped to the multiple layers. For example, the second wireless communication device decodes the data transmitted through two antennas, each corresponding to a first layer and a second layer. The decoded transport block comprises a first portion mapped to the first layer and a second portion mapped to the second layer. In some embodiments, upon determining that the first layer and the second layer are geospatially close, the second wireless communication device determines that a CRC attachment is omitted in the second portion of the transport block and performs a CRC check of both the first and second portions of the transport block using the CRC attachment associated with the first portion of the transport block. In some embodiments, the decoded transport block comprises more than two portions each mapped to one of the multiple layers, depending on the number of physical antennas available in the second wireless communication device. Based on geospatial proximity of the multiple layers, the second wireless communication device determines whether a CRC attachment is omitted in one or more portions of the transport block. The CRC attachment can be omitted in a subset of layers that have adjacent rank values and/or have even or odd rank values, depending on the beamforming technology.

Computer System

Figure 6:
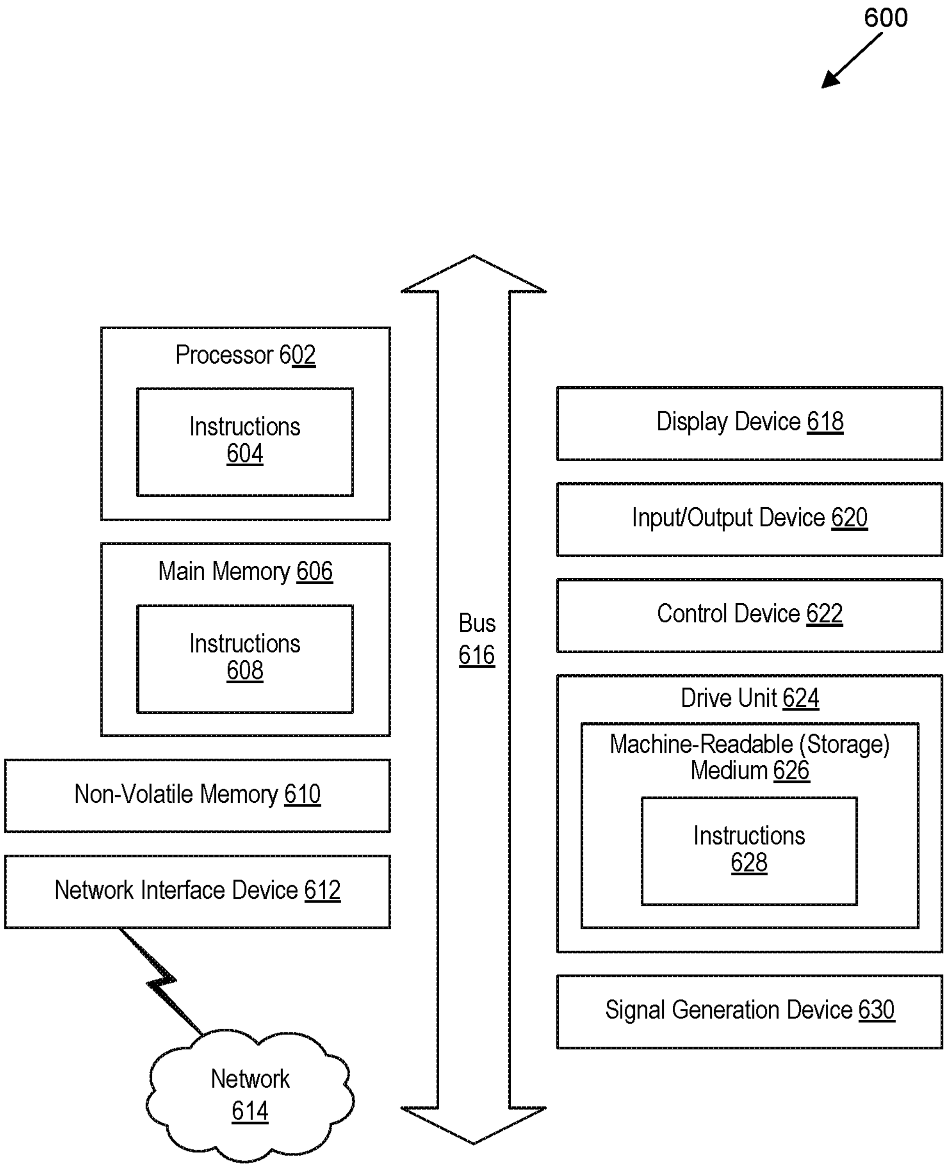
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or can include one or more cloud components in one or more networks. Where appropriate, one or more computer systems 600 can perform operations in real time, in near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A method for wireless communication, comprising:

determining, by a first wireless communication device, a transport block for a transmission of data bits to a second wireless communication device;

determining, by the first wireless communication device, multiple layers corresponding to multiple antennas for performing the transmission;

determining a mapping between the transport block and the multiple layers for the transmission to the second wireless communication device, wherein a first portion of the transport block is mapped to a first layer and a second portion of the transport block is mapped to a second layer;

selectively omitting, based on a beam characteristic associated with the first layer and the second layer, a second cyclic redundancy check (CRC) attachment in the second portion of the transport block in response to a first CRC being attached in the first portion of the transport block, wherein the selectively omitting the second CRC attachment comprises:

determining, by the first wireless communication device, that the first layer and the second layer share transmission characteristics due to geospatial proximity of beams associated with the first layer and the second layer, and omitting, by the first wireless communication device, the second CRC attachment to the second portion of the transport block in response to the geospatial proximity of the beams; and mapping the transport block to a physical channel for the transmission to the second wireless communication device.

2. The method of claim 1, wherein the determining of the mapping between the transport block and the multiple layers is performed prior to rate matching or modulating the first portion and the second portion of the transport block.

3. The method of claim 1, wherein a CRC attachment is omitted in part of the transport block mapped to remaining layers different from the first layer.

4. The method of claim 1, wherein a CRC attachment is omitted in part of the transport block mapped to a subset of layers that have even rank values.

5. The method of claim 1, wherein a CRC attachment is omitted in part of the transport block mapped to a subset of layers that have odd rank values.

6. The method of claim 1, wherein the beam characteristic comprises a geospatial proximity between a first antenna corresponding to the first layer and a second antenna corresponding to the second layer.

7. The method of claim 1, wherein the multiple layers are determined based on at least one of a capability of the second wireless communication device or a channel condition associated with the transmission.

8. A method for wireless communication, comprising:

receiving, by a second wireless communication device, a transmission of data from a first wireless communication device on a physical channel;

determining, by the second wireless communication device, multiple layers corresponding to multiple antennas for receiving the data; and decoding, by the second wireless communication device, the data based on the multiple layers, wherein the data is decoded as a transport block that comprises a first portion mapped to a first layer and a second portion mapped to a second layer, wherein a cyclic redundancy check (CRC) attachment is based on a beam characteristic that comprises a geospatial proximity between a first antenna corresponding to the first layer and a second antenna corresponding to the second layer, and determining, by the second wireless communication device, that a second CRC attachment is omitted in the second portion of the transport block in response to a first CRC being attached in the first portion of the transport block.

9. The method of claim 8, wherein determining that the second CRC attachment is omitted comprises:

determining, by the second wireless communication device, that the first layer and the second layer share transmission characteristics due to geospatial proximity of beams associated with the first layer and the second layer; and determining, by the second wireless communication device, that the second CRC attachment to the second portion of the transport block is omitted in response to the geospatial proximity of the beams.

10. The method of claim 8, wherein a CRC attachment is omitted in part of the transport block mapped to remaining layers different from the first layer.

11. The method of claim 8, wherein a CRC attachment is omitted in part of the transport block mapped to a subset of layers that have even rank values.

12. The method of claim 8, wherein a CRC attachment is omitted in part of the transport block mapped to a subset of layers that have odd rank values.

13. The method of claim 8, wherein the multiple layers are determined based on at least one of a capability of the second wireless communication device or a channel condition associated with the transmission.

14. A wireless communication device comprising:

at least one hardware processor; and at least one non-transitory memory storing instructions, which, when executed by the at least one hardware processor, cause the wireless communication device to:

determine a transport block for a transmission of data bits to a second wireless communication device;

determine multiple layers corresponding to multiple antennas for performing the transmission;

determine a mapping between the transport block and the multiple layers for the transmission to the second wireless communication device, wherein a first portion of the transport block is mapped to a first layer and a second portion of the transport block is mapped to a second layer;

selectively omit, based on a beam characteristic associated with the first layer and the second layer, a second cyclic redundancy check (CRC) attachment in the second portion of the transport block in response to a first CRC being attached in the first portion of the transport block, wherein the beam characteristic comprises a geospatial proximity between a first antenna corresponding to the first layer and a second antenna corresponding to the second layer; and map the transport block to a physical channel for the transmission to the second wireless communication device.

15. The wireless communication device of claim 14, wherein the selectively omitting the second CRC attachment comprises:

determining, by the wireless communication device, that the first layer and the second layer share transmission characteristics due to geospatial proximity of beams associated with the first layer and the second layer; and omitting, by the wireless communication device, the second CRC attachment to the second portion of the transport block in response to the geospatial proximity of the beams.

16. The wireless communication device of claim 15, wherein the determining of the mapping between the transport block and the multiple layers is performed prior to rate matching or modulating the first portion and the second portion of the transport block.

17. The wireless communication device of claim 15, wherein a CRC attachment is omitted in part of the transport block mapped to remaining layers different from the first layer.

18. The wireless communication device of claim 14, wherein a CRC attachment is omitted in part of the transport block mapped to a subset of layers that have even rank values.

19. The wireless communication device of claim 14, wherein a CRC attachment is omitted in part of the transport block mapped to a subset of layers that have odd rank values.

20. The wireless communication device of claim 14, wherein the multiple layers are determined based on at least one of a capability of the second wireless communication device or a channel condition associated with the transmission.

* * * * *